United States Patent
Craven et al.

(10) Patent No.: US 8,936,268 B2
(45) Date of Patent: Jan. 20, 2015

(54) TRACTION DEVICE AND APPARATUS WITH FOLDABLE FRAME

(76) Inventors: Curtis L Craven, Chesapeake, VA (US); Gerald Kent Craven, Providence, UT (US)

(*) Notice: Subject to any disclaimer, the term of this patent is extended or adjusted under 35 U.S.C. 154(b) by 153 days.

(21) Appl. No.: 13/370,775

(22) Filed: Feb. 10, 2012

(65) Prior Publication Data

US 2012/0205884 A1 Aug. 16, 2012

Related U.S. Application Data (60) Provisional application No. 61/463,340, filed on Feb. 16, 2011.

(51) Int. Cl.
| | | |
|---|---|---|
| *B62B 7/02* | (2006.01) | |
| *B62B 1/12* | (2006.01) | |
| *B62B 1/20* | (2006.01) | |
| *B62B 1/00* | (2006.01) | |
| *B62B 1/26* | (2006.01) | |

(52) U.S. Cl.
CPC . *B62B 1/008* (2013.01); *B62B 1/12* (2013.01); *B62B 1/208* (2013.01); *B62B 2202/52* (2013.01); *B62B 2301/33* (2013.01); *B62B 2301/254* (2013.01); *B62B 1/262* (2013.01); *B62B 2202/402* (2013.01)
USPC .......................................... 280/654; 280/652

(58) Field of Classification Search
USPC ............. 280/638, 639, 38, 641, 645, 42, 651, 280/652, 653, 654, 655, 659, 47.131, 47.17, 280/47.18, 47.3, 47.31, 47.315, 47.32, 280/47.33; 152/209.1, 209.8, 209.9, DIG. 1, 152/DIG. 17
See application file for complete search history.

(56) References Cited

U.S. PATENT DOCUMENTS

| | | | | |
|---|---|---|---|---|
| 1,127,339 A | * | 2/1915 | Wise ............................... | 152/182 |
| 1,211,958 A | * | 1/1917 | Overman ....................... | 152/166 |
| 1,525,616 A | * | 2/1925 | Mansfield ..................... | 301/44.3 |
| 1,542,537 A | * | 6/1925 | Van Horn ...................... | 301/44.3 |
| 1,581,165 A | * | 4/1926 | Brenneis ....................... | 301/44.3 |
| 1,594,502 A | * | 8/1926 | Elzey ............................ | 301/44.3 |
| D88,781 S | * | 12/1932 | Gunsaulus .................... | D12/536 |
| 2,149,205 A | * | 2/1939 | Brink ............................ | 152/411 |
| 2,183,066 A | * | 12/1939 | Fields ........................... | 280/43.1 |
| D122,391 S | * | 9/1940 | Delzell ......................... | D12/502 |
| 2,323,261 A | * | 6/1943 | Vigo .............................. | 440/30 |
| 2,403,309 A | * | 7/1946 | Smith ....................... | 152/209.16 |
| 2,424,799 A | * | 7/1947 | Colombo ..................... | 301/41.1 |
| 2,431,834 A | * | 12/1947 | Sinclair ......................... | 280/654 |
| 2,461,353 A | * | 2/1949 | Stelzer et al. .................. | 280/30 |

(Continued)

*Primary Examiner* — Brodie Follman (57) ABSTRACT

An apparatus for traversing loose, granular material includes a frame and a rotatable traction device connected to the frame. The outer surface of the rotatable traction device includes spaced apart curvilinear or angular traction ridges and spaced apart curved or angular valleys, each valley being between a pair of adjacent traction ridges, thereby forming curved or angular shovel-like elements. Each shovel-like element has a leading curved or angular surface and a confining curved or angular surface. Rotation of the rotatable traction device results in rotation of the shovel-like elements through the loose, granular material. Each shovel-like element enfolds a portion of the loose, granular material bordering the leading curved or angular surface of the shovel-like element, and the confining curved or angular surface of the shovel-like element confines at least part of the enfolded portion of the material, thereby confining and restricting displacement of the enfolded portion of the material.

14 Claims, 12 Drawing Sheets

(56) References Cited

U.S. PATENT DOCUMENTS

| | | | |
|---|---|---|---|
| 2,468,604 A | 4/1949 | Salat | |
| 2,546,604 A * | 3/1951 | Lafky | 296/20 |
| 2,552,168 A * | 5/1951 | Goolsby | 152/228 |
| D168,364 S * | 12/1952 | Martin | D12/563 |
| 2,626,649 A * | 1/1953 | Eiler et al. | 152/209.12 |
| 2,722,972 A * | 11/1955 | Altruda | 248/164 |
| 2,787,970 A * | 4/1957 | Bennett | 105/95 |
| 2,789,829 A * | 4/1957 | Parker | 280/654 |
| 2,918,296 A * | 12/1959 | Goodale | 280/645 |
| 2,946,625 A * | 7/1960 | Crain et al. | 301/43 |
| 2,967,058 A * | 1/1961 | Hoffmann, Jr. | 280/30 |
| 2,974,741 A * | 3/1961 | Witzmann | 180/15 |
| 2,979,016 A * | 4/1961 | Rossi | 440/100 |
| 2,992,011 A * | 7/1961 | Becan | 280/654 |
| 3,012,824 A * | 12/1961 | Weier | 301/43 |
| 3,035,651 A * | 5/1962 | O'Quinn | 180/6.2 |
| 3,054,622 A * | 9/1962 | Davis et al. | 280/645 |
| 3,071,050 A * | 1/1963 | Shatto | 404/124 |
| 3,074,763 A * | 1/1963 | Weier | 301/43 |
| 3,165,330 A * | 1/1965 | Cotton | 280/645 |
| 3,198,540 A | 8/1965 | Averett | |
| 3,242,896 A * | 3/1966 | Kauffmann | 440/12.69 |
| 3,246,910 A * | 4/1966 | Chura | 280/104 |
| 3,291,502 A * | 12/1966 | England | 280/645 |
| 3,336,037 A * | 8/1967 | Brozovich | 280/12.14 |
| 3,388,919 A * | 6/1968 | Waag | 280/654 |
| 3,418,960 A * | 12/1968 | Nelson | 440/12.66 |
| 3,435,873 A * | 4/1969 | Weier | 152/185.1 |
| 3,438,645 A * | 4/1969 | Pounders | 280/645 |
| 3,450,013 A * | 6/1969 | Peterson | 404/128 |
| 3,451,671 A * | 6/1969 | May | 482/51 |
| 3,463,063 A * | 8/1969 | Caron et al. | 404/124 |
| 3,511,291 A * | 5/1970 | Ragan | 152/209.1 |
| 3,542,145 A * | 11/1970 | Proffer | 180/219 |
| 3,606,856 A * | 9/1971 | Moraga | 440/100 |
| 3,628,493 A * | 12/1971 | Headrick | 440/12.7 |
| 3,677,571 A * | 7/1972 | Maturo et al. | 280/654 |
| 3,679,227 A * | 7/1972 | Rock | 280/47.24 |
| 3,693,993 A * | 9/1972 | Mazzarelli et al. | 280/30 |
| 3,736,971 A * | 6/1973 | Paul et al. | 152/525 |
| 3,826,511 A * | 7/1974 | Frank | 280/653 |
| 3,860,254 A * | 1/1975 | Wegener | 280/652 |
| 3,905,323 A * | 9/1975 | Kacere | 114/39.23 |
| 3,931,983 A * | 1/1976 | Kanouse et al. | 280/12.14 |
| 4,195,695 A * | 4/1980 | Dixon | 172/1 |
| 4,261,596 A * | 4/1981 | Douglas | 280/652 |
| 4,289,214 A * | 9/1981 | Spence | 180/234 |
| 4,337,966 A * | 7/1982 | Stevens | 280/645 |
| 4,355,818 A * | 10/1982 | Watts | 280/654 |
| 4,362,308 A * | 12/1982 | Hicks et al. | 280/30 |
| 4,392,536 A * | 7/1983 | Iwai et al. | 180/217 |
| 4,480,672 A * | 11/1984 | Marshall et al. | 152/209.12 |
| D278,136 S * | 3/1985 | Oba | D12/544 |
| 4,523,774 A * | 6/1985 | Dickerson | 280/655 |
| 4,530,620 A * | 7/1985 | McCartney | 404/121 |
| 4,647,067 A * | 3/1987 | Paquette et al. | 280/676 |
| 4,652,247 A * | 3/1987 | Goldfarb et al. | 446/164 |
| D296,026 S * | 5/1988 | Sugarman et al. | D34/25 |
| 4,815,761 A * | 3/1989 | Henderson et al. | 280/47.3 |
| 4,819,575 A * | 4/1989 | Dixon | 440/12.7 |
| 4,887,837 A * | 12/1989 | Bonewicz et al. | 280/654 |
| RE33,312 E * | 8/1990 | Elliot | 404/124 |
| D316,694 S * | 5/1991 | Nakasaki | D12/544 |
| 5,040,807 A * | 8/1991 | Snover | 280/30 |
| 5,178,088 A * | 1/1993 | Howard | 440/12.62 |
| 5,195,781 A * | 3/1993 | Osawa | 280/842 |
| 5,242,189 A * | 9/1993 | Osaki | 280/645 |
| 5,265,892 A * | 11/1993 | Said | 280/30 |
| D348,031 S * | 6/1994 | Chrobak | D12/503 |
| 5,460,307 A * | 10/1995 | Stevenson | 224/153 |
| 5,538,057 A * | 7/1996 | Homma et al. | 152/7 |
| 5,607,174 A * | 3/1997 | Ambrogio | 280/653 |
| D379,342 S * | 5/1997 | Ratliff, Jr. | D12/526 |
| 5,636,852 A * | 6/1997 | Sistrunk et al. | 280/30 |
| 5,653,458 A * | 8/1997 | Chaparian | 280/30 |
| 5,660,403 A * | 8/1997 | O'Neill et al. | 280/47.19 |
| 5,845,969 A * | 12/1998 | Grimaldi et al. | 297/445.1 |
| D403,827 S | 1/1999 | Smoker | |
| 5,857,695 A * | 1/1999 | Crowell | 280/651 |
| 5,944,333 A * | 8/1999 | Kent | 280/204 |
| 5,988,671 A * | 11/1999 | Abelbeck et al. | 280/649 |
| 6,082,757 A * | 7/2000 | Lin | 280/654 |
| 6,146,237 A * | 11/2000 | Rehkemper et al. | 446/440 |
| 6,264,230 B1 * | 7/2001 | Huggins | 280/651 |
| D449,570 S * | 10/2001 | Lo | D12/506 |
| D450,637 S * | 11/2001 | Lo | D12/512 |
| D464,608 S * | 10/2002 | Liu et al. | D12/535 |
| 6,598,898 B2 * | 7/2003 | Chu | 280/652 |
| 6,712,371 B2 * | 3/2004 | Trubiano | 280/274 |
| D497,590 S * | 10/2004 | Brown et al. | D12/570 |
| 6,988,737 B1 | 1/2006 | Clark | |
| 7,389,997 B2 * | 6/2008 | Johnson et al. | 280/47.19 |
| 7,793,744 B1 * | 9/2010 | Hardie | 180/19.1 |
| 8,322,746 B1 * | 12/2012 | Bosveld | 280/645 |
| 8,366,124 B1 * | 2/2013 | Caldwell | 280/30 |
| 8,382,135 B1 * | 2/2013 | Raike et al. | 280/281.1 |
| 2003/0011173 A1* | 1/2003 | Shall | 280/651 |
| 2003/0015858 A1* | 1/2003 | Chu | 280/652 |
| 2005/0029031 A1* | 2/2005 | Thomas | 180/205 |
| 2005/0161915 A1* | 7/2005 | Landefeld | 280/654 |
| 2009/0126150 A1* | 5/2009 | Tanaya | 16/112.1 |
| 2011/0025118 A1* | 2/2011 | Kouno | 301/41.1 |
| 2012/0168237 A1* | 7/2012 | Oliphant | 180/65.1 |
| 2012/0205884 A1* | 8/2012 | Craven et al. | 280/47.3 |
| 2012/0241060 A1* | 9/2012 | Hayashi | 152/209.8 |
| 2013/0037191 A1* | 2/2013 | Suzuki | 152/209.9 |

\* cited by examiner

TRACTION DEVICE AND APPARATUS WITH FOLDABLE FRAME

CROSS-REFERENCE TO RELATED APPLICATIONS

This application claims priority benefit of U.S. Provisional Patent Application No. 61/463,340, filed Feb. 16, 2011, titled Beach Cart With Bearing Tube, the entire disclosure of which is hereby expressly incorporated by reference herein.

BACKGROUND

Applicants' apparatus and devices relate to apparatus and devices for moving and transporting one or more objects or cargo. Applicants' apparatus and devices have particular application for carts and other vehicles used to move or transport objects or cargo across areas covered with sand or other loose, granular materials, including, but not limited to beach carts.

Many beach cart designs suffer from a variety of design defects and problems. For example, some beach carts use relatively small wheels, which contribute to overall compactness but perform poorly in the sand. Other beach carts sacrifice compactness for better performance by using large balloon-type wheels. The former cart type readily sinks in the sand due to insufficient wheel bearing area and tends to have a plowing or furrowing action. This makes it difficult and exhausting for users to transport loads through loose sand. The latter cart type utilizes large balloon-type tires to maintain an increased bearing area to resist sinking in loose sand, but such beach carts are large and bulky, making it cumbersome or even impossible to bring such carts to the beach, depending on a user's vehicle size. Neither beach cart type effectively provides a combination of compactness and increased bearing area enabling rolling over loose sand effectively under heavy load.

Some examples of beach carts that have the above-described problems and other problems are disclosed in U.S. Pat. No. 6,264,230 (Huggins); U.S. Pat. No. 6,988,337 (Clark); U.S. Pat. No. 3,677,571 (Maturo, Jr. et al.); and U.S. Pat. No. 5,660,403 (O'Neal et al.).

BRIEF SUMMARY

There are various aspects of Applicants' apparatus and devices and many variations of each aspect.

One aspect is an apparatus adapted to traverse an area covered with a loose, granular material. The apparatus includes a frame and a rotatable traction device. The frame has a first side and a second side spaced apart from and opposite the first side, each of the first side and the second side having an upper portion and a lower portion opposite the upper portion. The rotatable traction device has a first end, a second end, an outer surface, and a longitudinal axis about which at least some of the outer surface of the rotatable traction device revolves when the rotatable traction device rotates. The first end of the rotatable traction device is connected to the lower portion of the first side of the frame and the second end of the rotatable traction device is connected to the lower portion of the second side of the frame. At least a portion of the outer surface of the rotatable traction device includes a plurality of spaced apart curvilinear or angular traction ridges and a plurality of spaced apart curved or angular valleys. Each curved or angular valley is between a pair of adjacent curvilinear or angular traction ridges, thereby forming a plurality of curved or angular shovel-like elements in the rotatable traction device. Each shovel-like element has a leading curved or angular surface and a confining curved or angular surface. Rotation of the rotatable traction device results in rotation of the curved or angular shovel-like elements through at least a portion of the loose, granular material as the rotatable traction device rotates. Each curved or angular shovel-like element enfolds a portion of the loose, granular material bordering the leading curved or angular surface of the shovel-like element. The confining curved or angular surface of the shovel-like element confines at least part of the enfolded portion of the loose, granular material, thereby confining and restricting displacement of at least part of the enfolded portion of the loose, granular material as the apparatus traverses the area.

In a first variation of the apparatus, at least a portion of at least one curvilinear traction ridge is shaped as a wave. In a variant of this variation, the wave is uniform. In another variant, the wave is non-uniform.

In a second variation of the apparatus, at least a portion of at least one curvilinear traction ridge is shaped as a helix. In a variant of this variation, the helix is uniform. In another variant, the helix is non-uniform.

In a third variation of the apparatus, at least a portion of at least one angular traction ridge is triangular in shape.

In another variation of the apparatus, the rotatable traction device has a shape selected from a group including a cylindrical shape, a spherical shape, and an elliptical shape.

In yet another variation of the apparatus, the shovel-like element has a shape selected from a group including a curved open clam shell shape, an angular wedge-like shape, and a truncated pyramid shape.

Another aspect is a rotatable traction device adapted to traverse an area covered with a loose, granular material. The rotatable traction device has a first end, a second end, an outer surface, and a longitudinal axis about which at least some of the outer surface of the rotatable traction device revolves when the rotatable traction device rotates. At least a portion of the outer surface of the rotatable traction device includes a plurality of spaced apart curvilinear or angular traction ridges and a plurality of spaced apart curved or angular valleys. Each curved or angular valley is between a pair of adjacent curvilinear or angular traction ridges, thereby forming a plurality of curved or angular shovel-like elements in the rotatable traction device. Each shovel-like element has a leading curved or angular surface and a confining curved or angular surface. Rotation of the rotatable traction device results in rotation of the curved or angular shovel-like elements through at least a portion of the loose, granular material as the rotatable traction device rotates. Each curved or angular shovel-like element enfolds a portion of the loose, granular material bordering the leading curved or angular surface of the shovel-like element, and the confining curved or angular surface of the shovel-like element confines at least part of the enfolded portion of the loose, granular material, thereby confining and restricting displacement of at least part of the enfolded portion of the loose, granular material as the rotatable traction device traverses the area.

In a first variation of the rotatable traction device, at least a portion of at least one curvilinear traction ridge is shaped as a wave. In a variant of this variation, the wave is uniform. In another variant, the wave is non-uniform.

In a second variation of the rotatable traction device, at least a portion of at least one curvilinear traction ridge is shaped as a helix. In a variant of this variation, the helix is uniform. In another variant, the helix is non-uniform.

In a third variation of the rotatable traction device, at least a portion of at least one angular traction ridge is triangular in shape.

In another variation of the rotatable traction device, the rotatable traction device has a shape selected from a group including a cylindrical shape, a spherical shape, and an elliptical shape.

In yet another variation of the rotatable traction device, the shovel-like element has a shape selected from a group including a curved open clam shell shape, an angular wedge-like shape, and a truncated pyramid shape.

Another aspect is a foldable frame. The foldable frame includes a rear frame, a front frame, an elongated lower rear cross bar, a cargo bay floor, and an elongated upper rear cross bar. The rear frame has a first side, a second side spaced apart from and opposite the first side, each of the first side and the second side having an upper portion and a lower portion spaced apart from and opposite the upper portion. The front frame has a first side, a second side spaced apart from and opposite the first side, each of the first side and the second side having an upper portion and a lower portion spaced apart from and opposite the upper portion. The lower portion of the first side of the rear frame is pivotably and rotatably connected to the lower portion of the first side of the front frame, and the lower portion of the second side of the rear frame is pivotably and rotatably connected to the lower portion of the second side of the front frame. The elongated lower rear cross bar has a first end connected to the first side of the rear frame and a second end connected to the second side of the rear frame. The cargo bay floor has a first side, a second side spaced apart from and opposite the first side, each of the first side and the second side having an upper end and a lower end spaced apart from and opposite the upper end. The lower end of the first side of the cargo bay floor is pivotably and rotatably connected to the first side of the front frame, and a lower end of the second side of the cargo bay floor is pivotably and rotatably connected to the second side of the front frame. The upper end of the first side of the cargo bay floor is detachably connected to the lower rear cross bar adjacent the first end of the lower rear cross bar when the foldable frame is unfolded. The upper end of the second side of the cargo bay floor is detachably connected to the lower rear cross bar adjacent the second end of the lower rear cross bar when the foldable frame in unfolded. Connection of the upper ends of the first and second sides of the cargo bay floor to the lower rear cross bar locks the foldable frame in an open unfolded position. The elongated upper rear cross bar is spaced apart from and above the elongated lower rear cross bar. The elongated upper rear cross bar has a first end connected to the first side of the rear frame and a second end connected to the second side of the rear frame. The upper end of the first side of the cargo bay floor is detachably connected to the upper rear cross bar adjacent the first end of the upper rear cross bar when the foldable frame is folded. The upper end of the second side of the cargo bay floor is detachably connected to the upper rear cross bar adjacent the second end of the upper rear cross bar when the foldable frame is folded, whereby connection of the upper ends of the first and second sides of the cargo bay floor to the upper rear cross bar locks the foldable frame in a closed folded position.

In a first variation of the foldable frame, at least a portion of the rear frame has a convex shape, and at least a portion of the front frame has a concave shape. And, part of the convex shape of the rear frame nests in at least part of the concave shape of the front frame when the foldable frame is in a closed folded position.

In another variation of the foldable frame, the upper portion of the rear frame includes an adjustable handle that may be lowered or raised.

A second foldable frame is similar to the first foldable frame or any of the variations discussed above, but also includes a first elongated flexible material and a second elongated flexible material. The first elongated flexible material has a front end and a rear end opposite the front end. The front end of the first elongated flexible material is connected to the first side of the front frame above the cargo bay floor and the rear end of the first elongated flexible material is connected to the first side of the rear frame above the cargo bay floor. The second elongated flexible material has a front end and a rear end opposite the front end. The front end of the second elongated flexible material is connected to the second end of the front frame above the cargo bay floor and the rear end of the second elongated flexible material is connected to the second side of the rear frame of the cargo bay floor.

A third foldable frame is similar to the first foldable frame or any of the variations discussed above, but includes an elongated front cross bar and a front plate. The elongated front cross bar has a first end connected to the first side of the front frame and a second end connected to the second side of the front frame. The front plate is pivotably and rotatably connected to the elongated front cross bar. The front plate is adapted to provide a supporting base for the foldable frame when the foldable frame is unfolded.

BRIEF DESCRIPTION OF THE DRAWINGS

Applicants' apparatus and devices will be described by way of example with reference to the accompanying drawings, in which.

DETAILED DESCRIPTION

Several embodiments of Applicants' apparatus and devices are shown in FIGS. 1-12, including embodiments of the apparatus in the form of a foldable beach cart in various positions. Persons skilled in the art will recognize that Applicants' apparatus may also take the form of other carts (e.g., hand carts, motorized carts, and other types of carts) and vehicles for moving or transporting one or more objects or cargo. Such persons will also recognize that the various types of the apparatus may be foldable, non-foldable, or partially foldable. In addition, such persons will recognize that the rotatable traction devices illustrated in FIGS. 1-12 may take forms other than that shown in FIGS. 1-12, as discussed herein.

FIGS. 1-6 and 12 illustrate an embodiment of Applicants' apparatus 10 in the form of a foldable beach cart using a rotatable traction device 12, which is shown in those figures and is better illustrated in FIGS. 7-10. The beach cart includes a foldable frame 14, a rotatable traction device 12, a cargo bay floor 16, a flexible material 18 on the sides of the cargo bay 20, a retractable standing plate 22, fishing pole sleeves 24, and Velcro® strips or hooks 26 to fasten miscellaneous items, such as beach umbrellas, folding chairs, beach toys, and the like. As shown in FIGS. 3-6, the frame 14 with the various components attached thereto is foldable into a compact unit which is readily transportable.

The embodiments illustrated in FIGS. 1-6 and 12 include a rear frame 14R connected to a front frame 14F at a pivot point 19 about which the rear frame 14R and the front frame 14F rotate when the frame 14 is folded and unfolded. In the illustrated embodiment, the pivot point 19 is located on or near the longitudinal axis about which the rotatable traction device 12 rotates.

Figure 6:
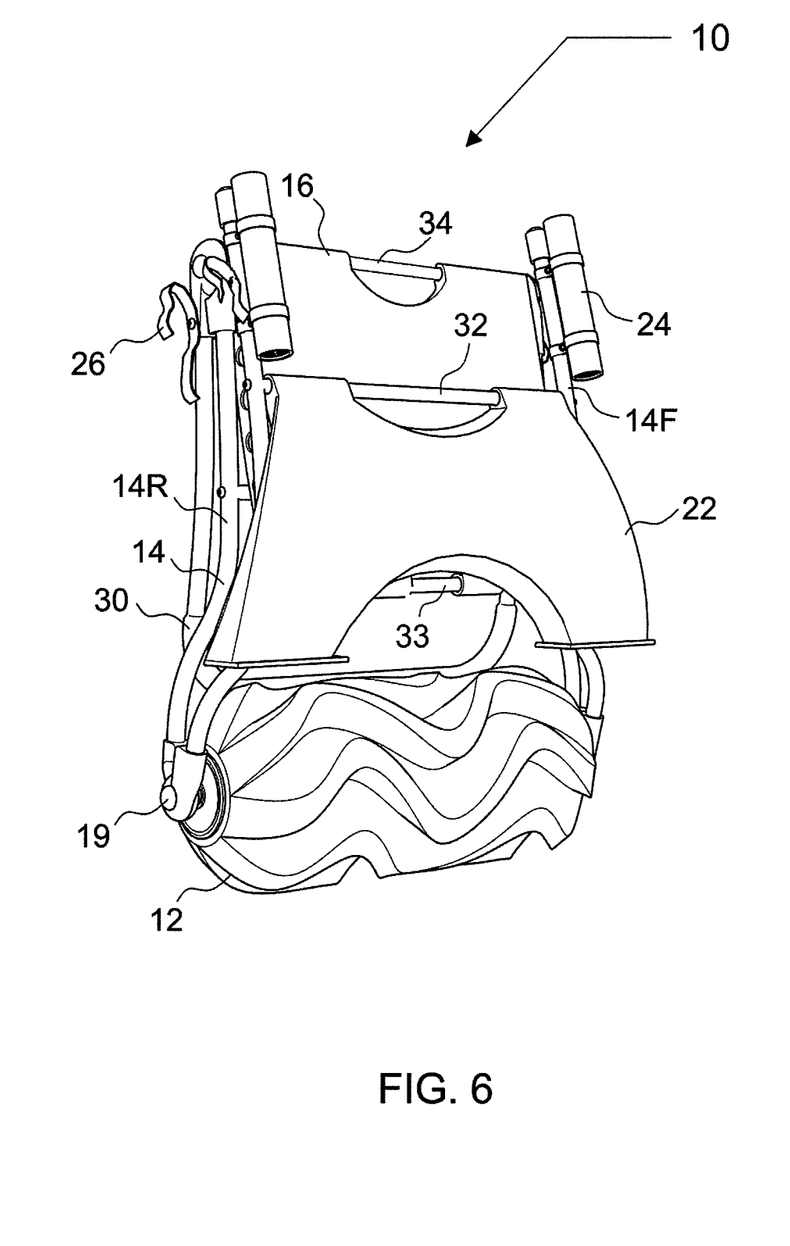
FIG. 6 is a schematic perspective view of a fully folded embodiment of Applicants' apparatus, such as those shown in FIGS. 2-5.
Figure 12:
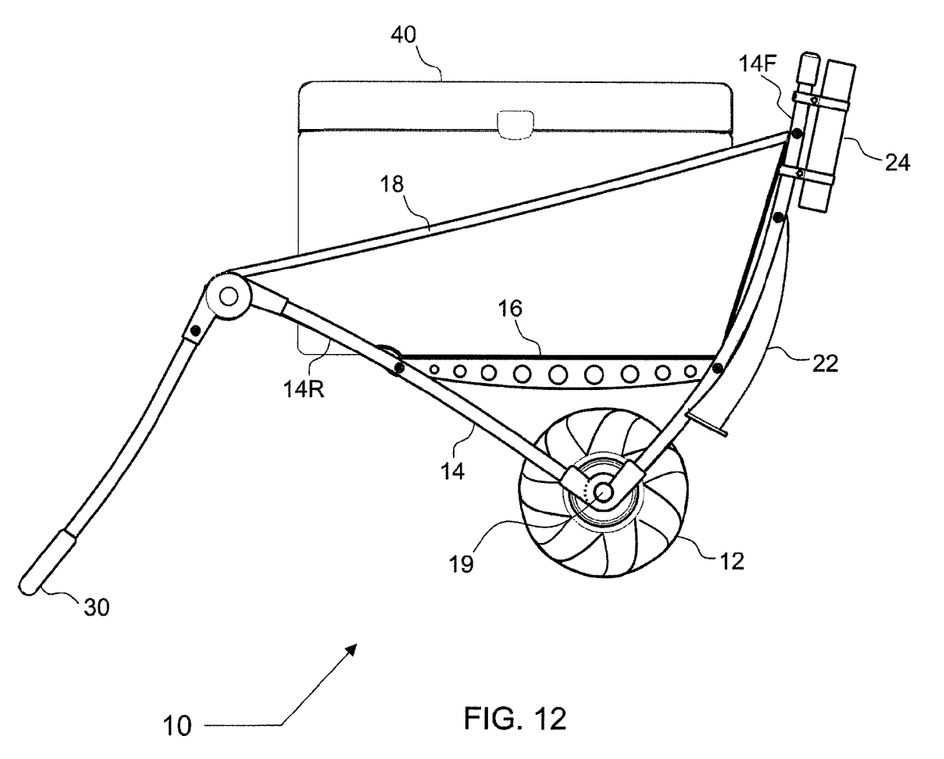
FIG. 12 is a schematic elevation view of an embodiment of Applicants' apparatus in an open position and with a loaded cargo bay.

As shown in FIGS. 1-6 and 12 at least part of the rear frame 14R has a convex shape and at least part of the front frame 14F has a concave shape. When the apparatus 10 is folded, as shown in FIG. 6, the convex shape of the rear frame 14R nests in the concave shape of the front frame 14F. The upper portion of the rear frame 14R includes an adjustable handle 30 which folds down when the apparatus 10 is completely folded, as shown in FIG. 6. The height of the handle 30 is adjustable for ease of use by end users of different heights during movement of the apparatus 10. The handle 30 also can be used to effect a flat and level cargo bay floor 16 for level operation of an ice chest or such, as shown in FIG. 12.

As shown in FIGS. 1-6, there are two cross bars 32 on the front frame 14F—an upper front cross bar 32 and a lower front cross bar 33—, and two cross bars on the rear frame 14R—an upper rear cross bar 34 and a lower rear cross bar 36. The cargo bay floor 16 is pivotably and rotatably connected to the lower front cross bar 33. When the apparatus is in the open unfolded position, the cargo bay floor 16 is detachably connected to the lower rear cross bar 36, and effectively locks the foldable frame 14 in the open unfolded position, which also provides rigidity against frame racking. When the apparatus 10 is in the closed folded position, as illustrated in FIG. 6, the upper end of the cargo bay floor 16 is detachably connected to the upper rear cross bar 34, which effectively locks the foldable frame 14 in the closed folded position. Front cross bar 32 can serve as a convenient carry handle when the apparatus 10 is in the closed folded position.

The retractable standing plate 22 is pivotably and rotatably connected to the front cross bar 32, and is designed to be in the closed position shown in FIGS. 2-6 when the apparatus 10 is in the transport mode (FIG. 2) or the closed folded mode (FIG. 6). However, when the apparatus 10 is loaded with cargo 40, as shown in FIG. 12, and is to be kept stationary at the beach or desired location, the retractable standing plate 22 is may be rotated downward to the standing position, as shown in FIG. 1.

In the closed folded mode (FIG. 6), the retractable standing plate 22 is secured to the frame 14 in the closed position maintaining a locked compactness for transport. The compactness of the folded apparatus 10 has multiple benefits. For example, in addition to being easy to transport and use by end users, the compact folded apparatus 10 provides benefits to manufacturers and retailers in the form of reduced shipping costs, reduced space for storage, ease of handling, etc.

Figure 1:
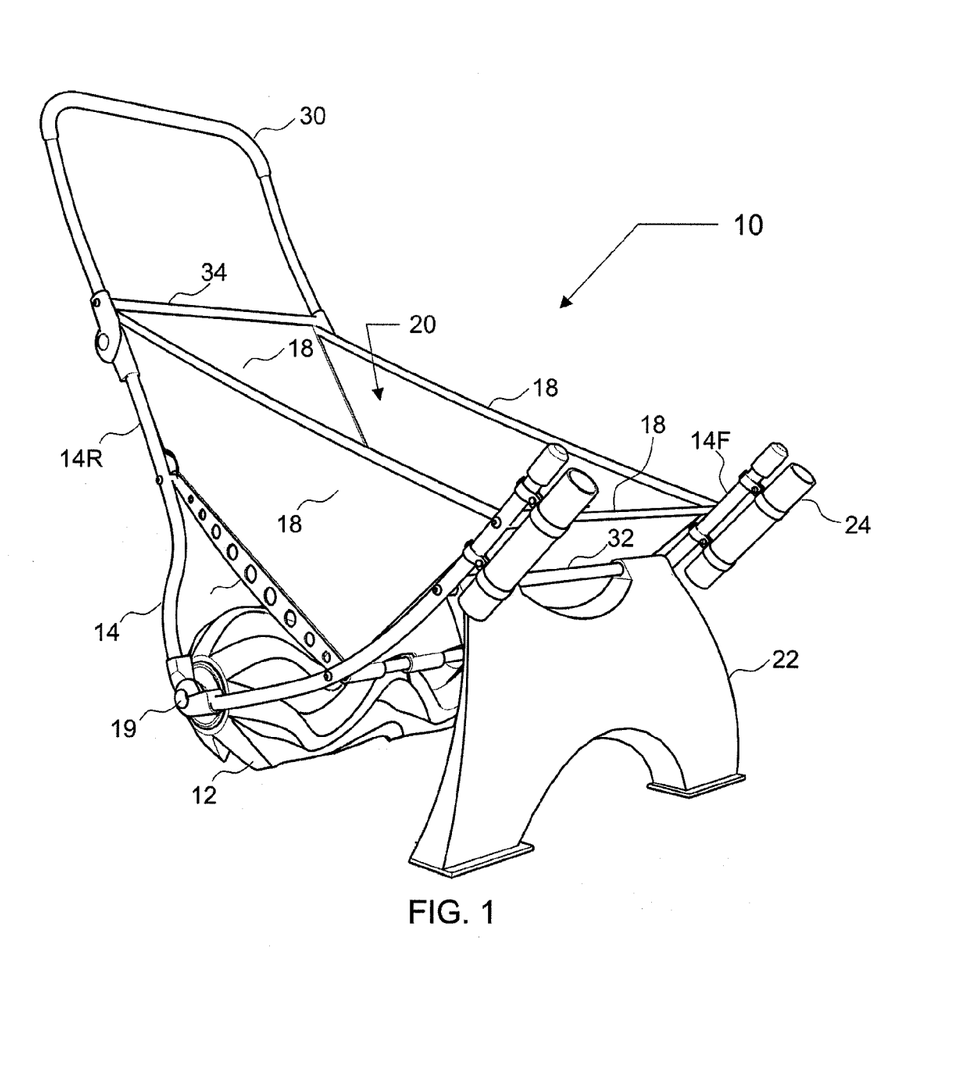
FIG. 1 is a schematic perspective view of one embodiment of Applicants' apparatus.
Figure 2:
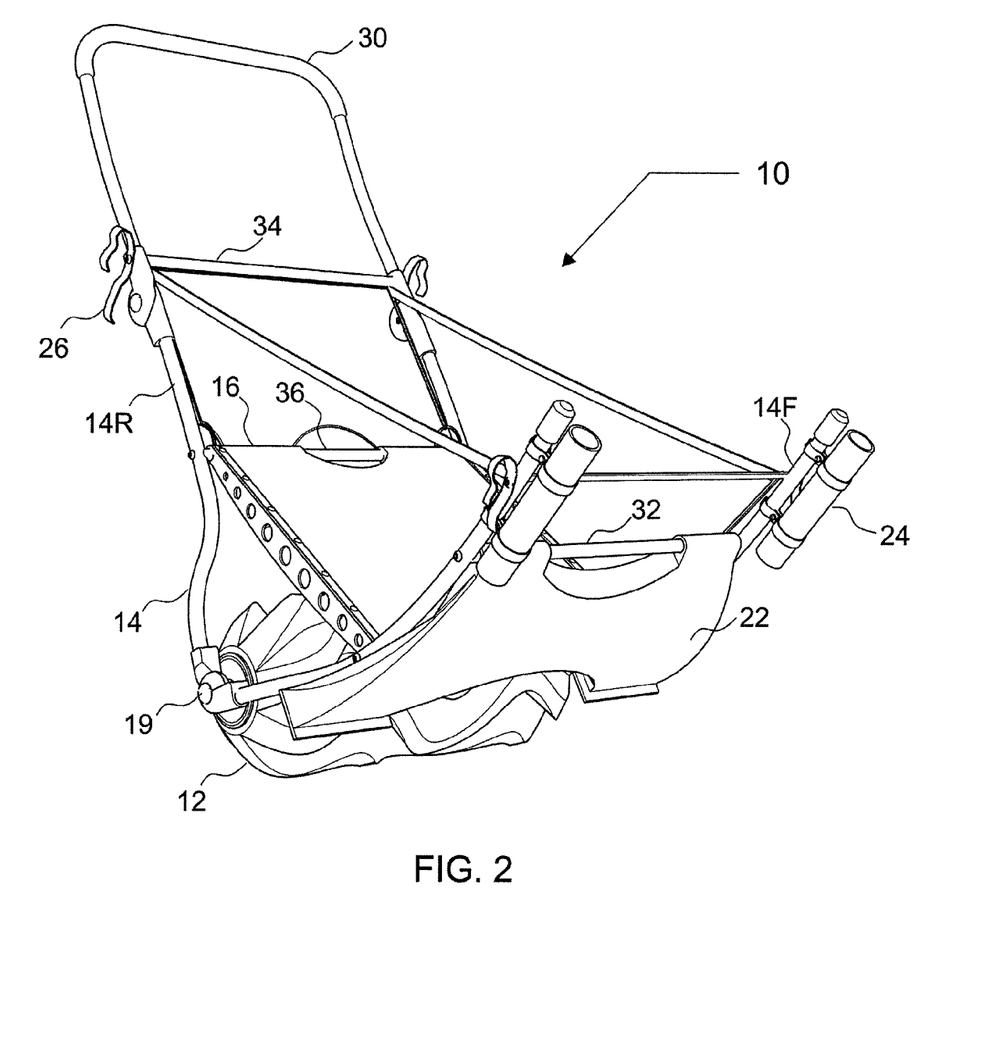
FIG. 2 is a schematic perspective view of another embodiment of Applicants' apparatus.
Figure 3:
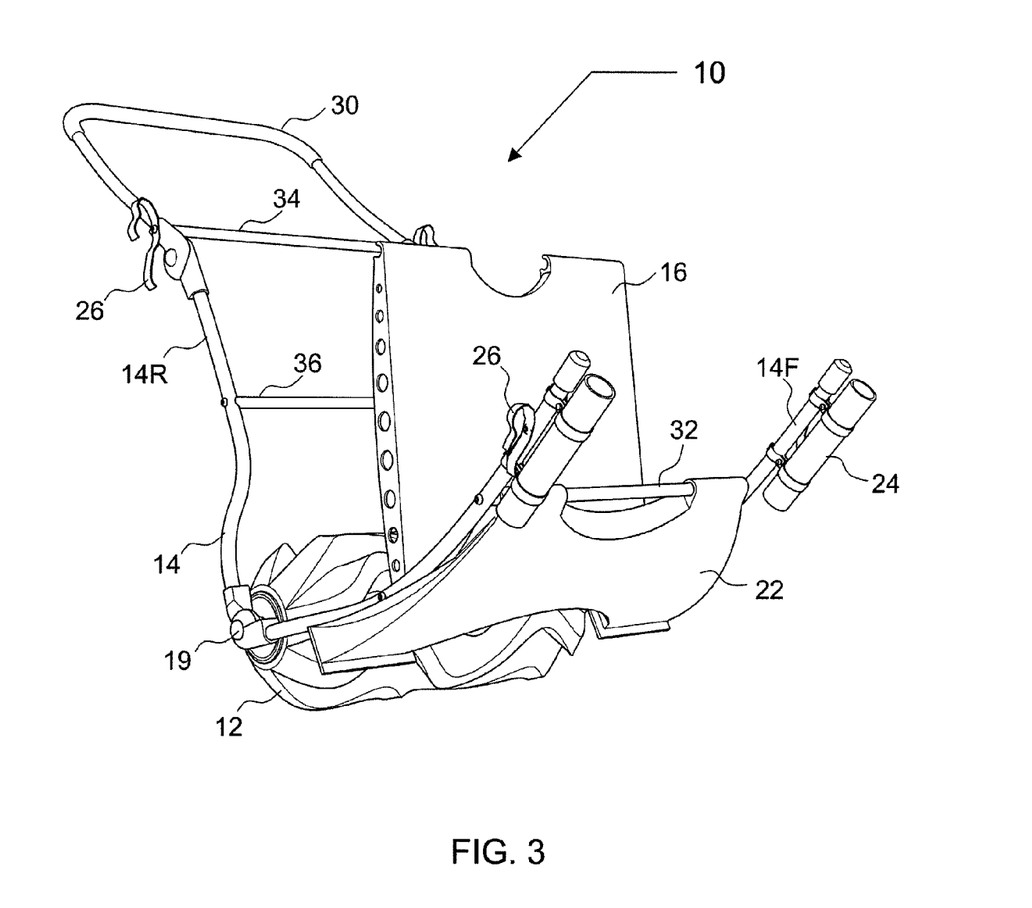
FIG. 3 is a schematic perspective view of a partially folded embodiment of Applicants' apparatus that is shown in an unfolded open position in FIG. 2.
Figure 4:
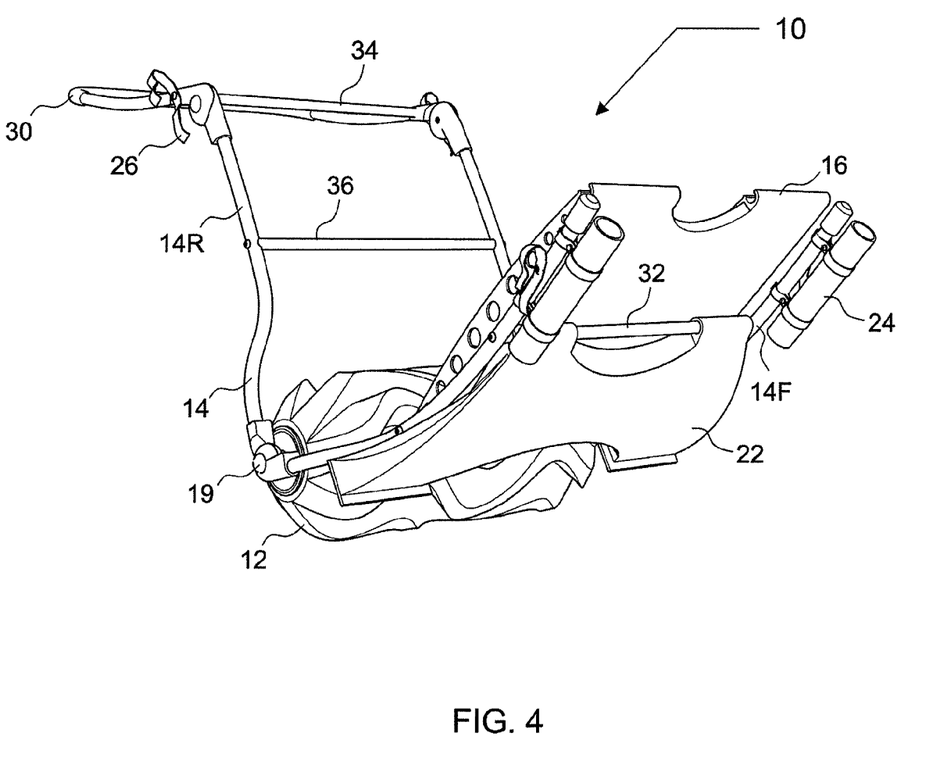
FIG. 4 is a schematic perspective view of a further folded embodiment of Applicants' apparatus, such as those shown in FIGS. 2 and 3.
Figure 5:
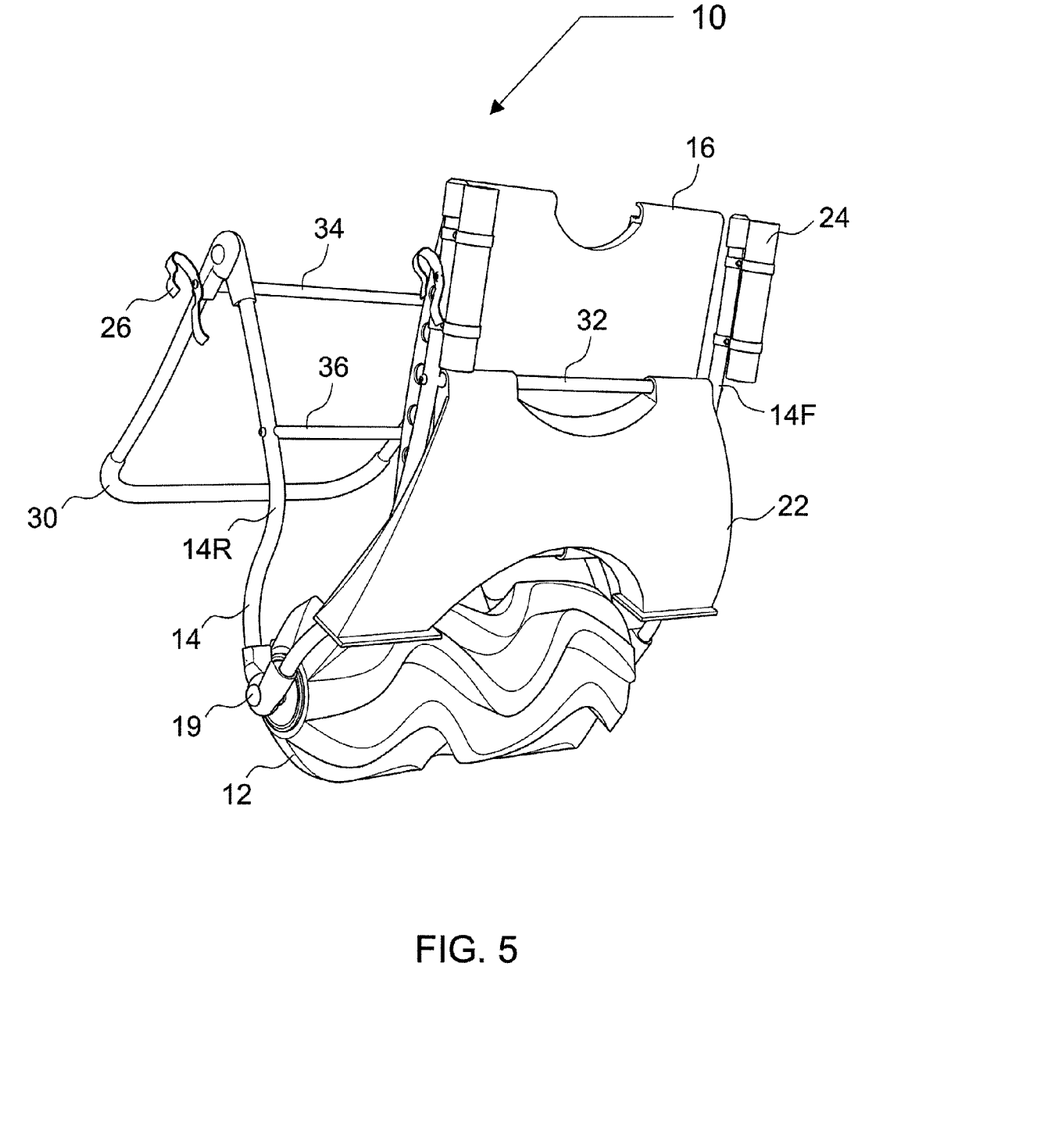
FIG. 5 is a schematic perspective view of yet a further folded embodiment of Applicants' apparatus, such as those shown in FIGS. 2-4.

The flexible material 18 or netting shown in FIG. 1 may be a polyester sports mesh with a top bungee-like perimeter cord. The netting may be clipped to the frame 14, and may be easily unclipped from the frame 14 to convert into a portable laundry hamper bag to carry beach items from one location to another (e.g., from the car to the house).

When the apparatus 10 is folded, some space is left between the front frame 14F and the rear frame 14R to accommodate the folded flexible material 18.

Applicants have designed an embodiment of a beach cart such as that illustrated in FIGS. 1-6 and 12 to meet three center of gravity requirements. Each of these requirements is discussed below.

First—Balanced Condition When Loaded: when loaded (e.g., about 75 lbs.) the center of gravity falls within about 2.5 inches of either side of the axle center line to keep the upward or downward force on the arm of the end user to no greater than about 10 lbs.

Second—Center of Gravity Forward of Axle: when the apparatus 10 is at rest on the retractable standing plate 22, as in FIG. 1, the loaded center of gravity is in front of the axle so that the loaded apparatus 10 remains in a stable position.

Third—Center of Gravity to Rear of Axle: when the apparatus 10 is in the "level cooler" rest position on the beach as in FIG. 12, the center of gravity is behind the axle to provide a stable at rest position. The adjustable handle 30 is adjusted to accommodate this at rest position.

Figure 7:
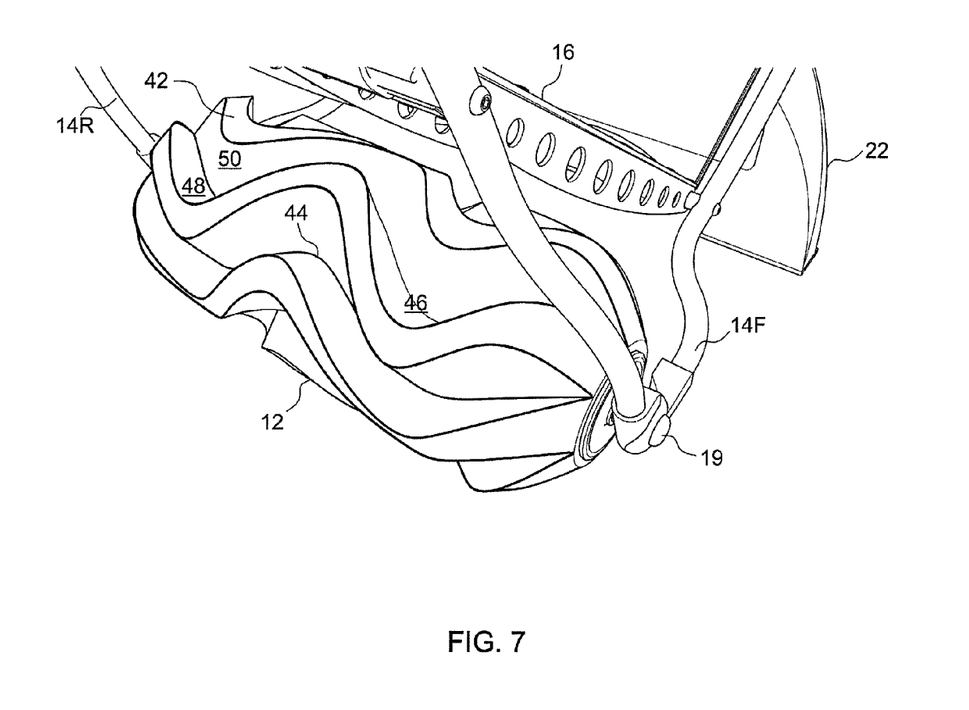
FIG. 7 is a schematic perspective view illustrating one embodiment of a rotatable traction device connected to a frame of one embodiment of Applicants' apparatus.
Figure 8:
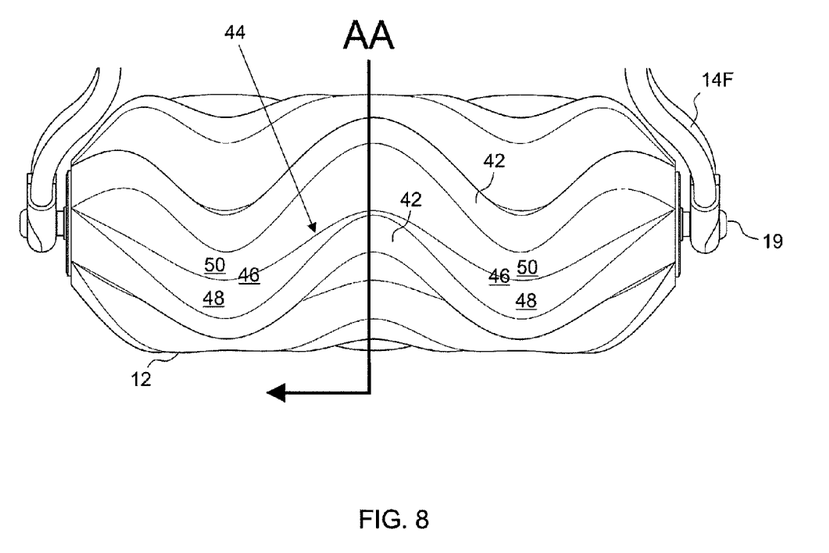
FIG. 8 is a schematic elevation view of one embodiment of a rotatable traction device connected to a frame of Applicants' apparatus.

The rotatable traction device 12, which is best shown in FIGS. 7 and 8, enables the apparatus 10 to travel efficiently and effectively across sand on a beach or on other loose, granular material covering an area to be traversed by the apparatus 10. The rotatable traction device 12 includes a plurality of spaced apart curvilinear traction ridges 42 and a plurality of spaced apart curved valleys 44. Each curved valley 44 between a pair of adjacent curvilinear traction ridges 42 forms a curved shovel-like element 46 in the rotatable traction device 12. Each shovel-like element 46 has a leading curved surface 48 and a confining curved surface 50.

When an end user moves (e.g., pulls) the apparatus 10, such as the illustrated beach cart, across the sand on a beach, the rotatable traction device 12 rotates. During rotation, the curved shovel-like elements 46 rotate through the sand. Each curved shovel-like element 46 enfolds a portion of the sand bordering the leading curved surface 48 of the curved shovel-like element 46, and the confining curved surface 50 of the shovel-like element 46 applies a confining force to the enfolded portion of the sand, thereby confining and restricting displacement of the enfolded portion of the sand as the apparatus 10 moves across the sand-covered area.

In the embodiments of the apparatus 10 and the rotatable traction device 12 illustrated in FIGS. 1-8, the curvilinear traction ridges 42 of the rotatable traction device 12 are shaped as a uniform wave. Persons skilled in the art will recognize that other designs are possible, such as where the waves are non-uniform.

Figure 9:
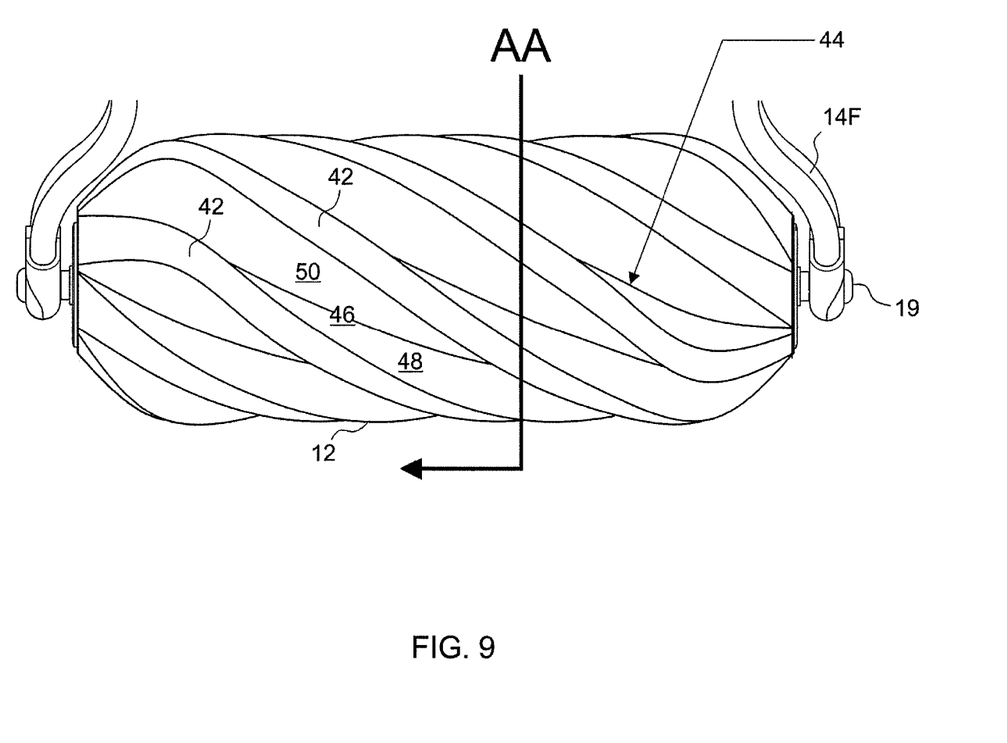
FIG. 9 is a schematic elevation view of another embodiment of a rotatable traction device connected to a frame of Applicants' apparatus.

In other embodiments, the curvilinear traction ridges 42 of the rotatable traction device 12 are shaped as a helix, as illustrated in FIG. 9, instead of a wave. As with the wave shape, the helix-shaped traction ridges 42 may be uniform or non-uniform. Persons skilled in the art will recognize that there are additional possible shapes, other than a wave or a helix, which could be used for the curvilinear traction ridges 42 of the rotatable traction device 12.

Figure 10:
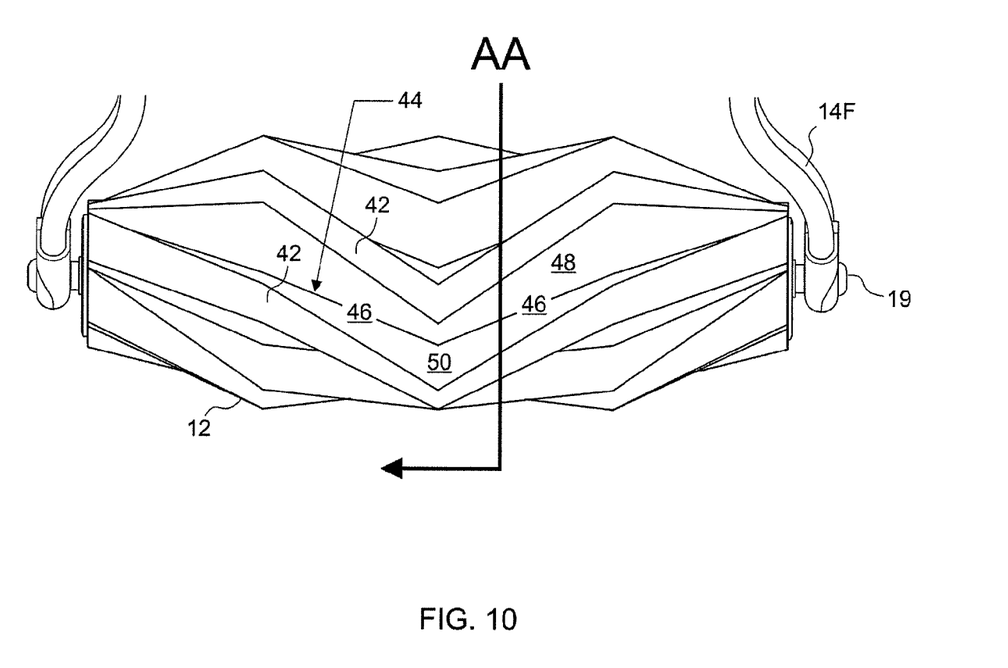
FIG. 10 is a schematic elevation view of another embodiment of a rotatable traction device connected to a frame of Applicants' apparatus.

Persons skilled in the art also will recognize that the traction ridges 42 of the rotatable traction device 12 may have shapes other than curvilinear. For example, angular traction ridges 42 may be used, as illustrated in FIG. 10. Although the angular traction ridges 42 in FIG. 10 have the shape of triangles, other angular shapes also may be used. As with the curvilinear design discussed earlier, the angular traction ridges 42 of the rotatable traction device 12 may be uniform or non-uniform.

In the case of an angular design, such as illustrated in FIG. 10, the rotatable traction device 12 includes a plurality of spaced apart angular traction ridges 42 and a plurality of spaced apart angular valleys 44. Each angular valley 44 between a pair of adjacent angular traction ridges 42 forms an angular shovel-like element 46 in the rotatable traction device 12. Each shovel-like element 46 has a leading angular surface 48 and a confining angular surface 50.

When an end user moves the apparatus 10 across the sand on a beach, the rotatable traction device 12 shown in FIG. 10 rotates. During rotation, the angular shovel-like elements 46 rotate through the sand. Each angular shovel-like element 46 enfolds a portion of the sand bordering the leading angular surface 48 of the angular shovel-like element 46, and the confining angular surface 50 of the shovel-like element 46 applies a confining force to the enfolded portion of the sand, thereby confining and restricting displacement of the enfolded portion of the sand as the apparatus 10 moves across the sand-covered area.

As shown by the illustrations in the drawings and the discussion above, the term "shovel-like element" as used herein is a portion of the rotatable traction device 12 having a curved open clam shell shape, angular wedge-like shape, or other such shape. In the case of the curvilinear design, the shovel-like element 46 comprises a portion of the adjacent curvilinear traction ridges 42 and the curved valley 44 between those. In the case of the angular design, the shovel-like element 46 comprises a portion of the adjacent angular traction ridges 42 and the angular valley 44 between those. Persons skilled in the art will recognize that the shovel-like element 44 may have shapes other than curved or angular, depending on the shapes of the adjacent traction ridges 42 and depending on whether the traction ridges 42 are uniform or non-uniform.

Figure 11A:
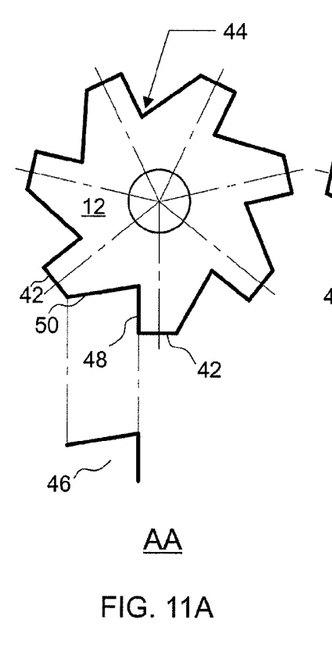
FIGS. 11A-11C are schematic illustrations of cross-sectional views of three variations of Applicants' rotatable traction device.
Figure 11B:
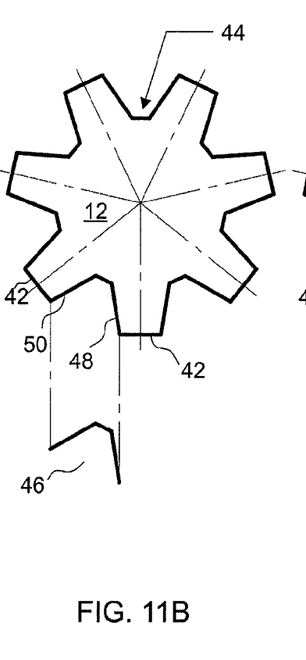
Figure 11C:
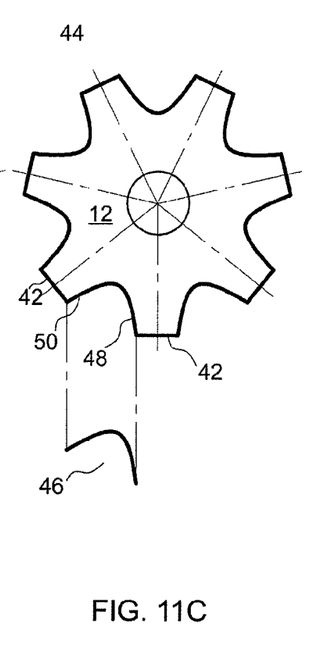

A cross-sectional view of the rotatable traction device 12, as shown in FIG. 11A, illustrates the wedge shape of the shovel-like element 46. Persons skilled in the art will recognize that the shovel-like element 46 may also have other shapes in other embodiments of the rotatable traction device 12. See, for example, FIG. 11B illustrating a truncated pyramid shape and FIG. 11C illustrating an arc shape.

The embodiments of Applicants' rotatable traction device 12 shown is FIGS. 7-10 are in the form of an elongated cylinder which has uniform traction ridges 42 across the length of the rotatable traction device 12. Persons skilled in the art will recognize that many other alternatives are possible. For example, the rotatable traction device 12 can have a spherical shape, an elliptical shape, or other shapes besides a cylinder, an ellipse, or a sphere. Or, rather than a single cylinder, ellipse, or sphere, there can be a plurality of cylindrical, elliptical, or spherical rotatable traction devices in a series or a parallel arrangement.

Also, whereas the illustrated embodiment has traction ridges 42 across the full length of the rotatable traction device 12, it is feasible to have a rotatable traction device on which the traction ridges 42 cover less than the entire length of the cylinder (or sphere, or ellipse, or other shape). Also, as discussed above, the traction ridges 42 can be non-uniform. Persons skilled in the art will recognize that many other variations are possible.

The rotatable traction device 12 used with Applicants' apparatus achieves at least four favorable outcomes:
1) forward rolling in the sand instead of sliding;
2) bearing on the upper layers of sand instead of sinking;
3) minimum possible diameter for compactness; and
4) as light weight as possible.

Each of these is discussed below.

First, sliding in the sand is a problem with many earlier beach cart designs. When rolling forward, some beach cart wheels or rolling devices apply a forward force against the sand without a confining overhead element or face to restrict the sand against displacing, which actively promotes a shear plane failure in the sand. When the shear plane failure occurs, there is a transformation from static to dynamic friction and the wheels or other rolling devices simply slide through the sand, displacing sand in the process. This is a common problem with soft, fluffy, dry sand for earlier beach cart designs.

The confining face 50 of Applicants' rotatable traction device 12 creates a normal force compression zone to a potential shear failure plane. Since the force required to initiate a shear failure is proportional to normal force, this acts to increase the force required to initiate a shear plane failure.

Second, Applicants' rotatable traction device 12 also provides a bearing on the upper layer of sand, instead of sinking excessively as do beach carts of earlier designs. A shear plane will also develop as a result of direct weight associated with the downward force of gravity. The gravity force applied by the wheels and/or rolling devices of earlier beach cart designs actively works to generate a failure plane, as generally circular elements apply a force directly perpendicular and away from the rounded elements face, which is directly in line, or parallel to, a shear failure plane. In contrast, with Applicants' rotatable traction device 12, the resultant downward gravity forces are applied largely perpendicular to a shear failure plane, thereby working to create a compression zone that increases the shear capacity of the sand, as well as providing confinement of the sand against movement. This yields better floating behavior as a result of reduced sand displacement and associated sinking, unlike other beach carts of earlier designs.

Third, size is minimized to the point of being able to successfully support about 75 lbs. while remaining suitably compact enough to be easily used by members of the general public.

Fourth, Applicants' rotatable traction device 12 is relatively light compared to the devices used in earlier beach cart designs. In one embodiment, an expanded, light-weight foam is used to greatly reduce the weight (less than 2 lbs.). However, the number and size of the curvilinear traction ridges 42 must be sufficient to provide smooth rolling on solid surfaces such as asphalt or concrete while withstanding compressive failure (yield/collapse) of the traction ridges. Thus, the radius of the waves are designed in a balanced fashion so as to insure sufficient contact area on hard surfaces to reduce contact pressure to a level sufficiently low to protect against traction ridge crushing or compressive failure (yield/compressive deformation), while not occurring so frequently as to diminish the size of the shovel-like elements 46 to the point of applying insufficient perpendicular compression force to a potential shear failure plane in soft sand.

Applicants' apparatus and devices include many other embodiments and variations thereof which are not illustrated in the drawings or discussed in the Detailed Description section. Those embodiments and variations, however, do fall within the scope of the appended claims and equivalents thereof.

Persons skilled in the art will recognize that the embodiments and variations illustrated in the drawings and discussed in the Detailed Description section do not disclose all of the possible arrangements of Applicants' apparatus and devices, and that other arrangements are possible. Accordingly, all such other arrangements are contemplated by Applicants' apparatus and devices, and are within the scope of the appended claims and equivalents thereof.

Persons skilled in the art also will recognize that many other embodiments incorporating Applicants' inventive concepts are possible, as well as many variations of the embodiments illustrated and described herein.

Although Applicants' apparatus and devices are discussed herein in connection with a beach cart, persons skilled in the art will recognize that Applicants' apparatus and devices also may be used with other types of carts, vehicles, and mobile devices, not in sand only, but also in other loose, granular materials.

Although illustrated and described herein with reference to certain specific embodiments, Applicants' apparatus and devices are nevertheless not intended to be limited to the details shown. Rather, various modifications may be made in the details within the scope and range of equivalents of the claims without departing from the spirit of the invention.

What is claimed is:

1. An apparatus adapted to traverse an area covered with a loose, granular material, comprising:
    a frame having a first side and a second side spaced apart from and opposite the first side, each of the first side and the second side having an upper portion and a lower portion opposite the upper portion; and
    a rotatable traction device having a first end, a second end, an outer surface, and a longitudinal axis about which at least some of the outer surface of the rotatable traction device revolves when the rotatable traction device rotates,
    wherein the first end of the rotatable traction device is connected to the lower portion of the first side of the frame and the second end of the rotatable traction device is connected to the lower portion of the second side of the frame,
    wherein at least a portion of the outer surface of the rotatable traction device between the first end and the second end includes a plurality of spaced apart curvilinear or angularly shaped traction ridges and a plurality of spaced apart curved or angularly shaped valleys, each curved or angularly shaped valley having at least one curved or angularly shaped wall and being between a pair of adjacent curvilinear or angularly shaped traction ridges, thereby forming a plurality of curved or angularly shaped shovel-like elements in the rotatable traction device, each shovel-like element having a leading curved or angularly shaped surface and a confining curved or angularly shaped surface, and
    wherein rotation of the rotatable fraction device results in rotation of the curved or angularly shaped shovel-like elements through at least a portion of the loose, granular material as the rotatable traction device rotates,
    whereby each curved or angularly shaped shovel-like element enfolds all or substantially all of a portion of the loose, granular material bordering the leading curved or angularly shaped surface of the shovel-like element, and the confining curved or angularly shaped surface of the shovel-like element confines all or substantially all of the enfolded portion of the loose, granular material, thereby confining and restricting displacement of all or substantially all of the enfolded portion of the loose, granular material as the apparatus traverses the area.

2. An apparatus as in claim 1, wherein at least a portion of at least one curvilinear traction ridge is shaped as a wave.

3. An apparatus as in claim 2, wherein the wave is uniform.

4. An apparatus as in claim 2, wherein the wave is non-uniform.

5. An apparatus as in claim 1, wherein at least a portion of at least one angularly shaped traction ridge is triangular in shape.

6. An apparatus as in claim 1, wherein the rotatable traction device has a shape selected from a group including a cylindrical shape, a spherical shape, and an elliptical shape.

7. An apparatus as in claim 1, wherein each of the shovel-like elements has a shape selected from a group including a curved open clam shell shape, an angular wedge-like shape, and a truncated pyramid shape.

8. A rotatable traction device adapted to traverse an area covered with a loose, granular material, the rotatable traction device having a first end, a second end, an outer surface, and a longitudinal axis about which at least some of the outer surface of the rotatable traction device revolves when the rotatable traction device rotates,
    wherein at least a portion of the outer surface of the rotatable traction device between the first end and the second end includes a plurality of spaced apart curvilinear or angularly shaped traction ridges and a plurality of spaced apart curved or angularly shaped valleys, each curved or angularly shaped valley having at least one curved or angularly shaped wall and being between a pair of adjacent curvilinear or angularly shaped traction ridges, thereby forming a plurality of curved or angularly shaped shovel-like elements in the rotatable traction device, each shovel-like element having a leading curved or angularly shaped surface and a confining curved or angularly shaped surface, and
    wherein rotation of the rotatable fraction device results in rotation of the curved or angularly shaped shovel-like elements through at least a portion of the loose, granular material as the rotatable traction device rotates,
    whereby each curved or angularly shaped shovel-like element enfolds all or substantially all of a portion of the loose, granular material bordering the leading curved or angularly shaped surface of the shovel-like element, and the confining curved or angularly shaped surface of the shovel-like element confines all or substantially all of the enfolded portion of the loose, granular material, thereby confining and restricting displacement of all or substantially all of the enfolded portion of the loose, granular material as the rotatable traction device traverses the area.

9. A rotatable traction device as in claim 8, wherein at least a portion of at least one curvilinear fraction ridge is shaped as a wave.

10. A rotatable traction device as in claim 9, wherein the wave is uniform.

11. A rotatable traction device as in claim 9, wherein the wave is non-uniform.

12. A rotatable traction device as in claim 8, wherein at least a portion of at least one angularly shaped traction ridge is triangular in shape.

13. A rotatable traction device as in claim 8, wherein the rotatable traction device has a shape selected from a group including a cylindrical shape, a spherical shape, and an elliptical shape.

14. A rotatable traction device as in claim 8, wherein each of the shovel-like elements has a shape selected from a group including a curved open clam shell shape, an angular wedge-like shape, and a truncated pyramid shape.

* * * * *